Feb. 4, 1930. E. LUCAS 1,745,765
SYSTEM OF HEATING, DRYING, OR COOLING BUILDINGS
Filed April 1, 1926 2 Sheets-Sheet 1

Eugene Lucas INVENTOR
BY C. Campbell Hunicke
ATTORNEY

Feb. 4, 1930. E. LUCAS 1,745,765
SYSTEM OF HEATING, DRYING, OR COOLING BUILDINGS
Filed April 1, 1926 2 Sheets-Sheet 2
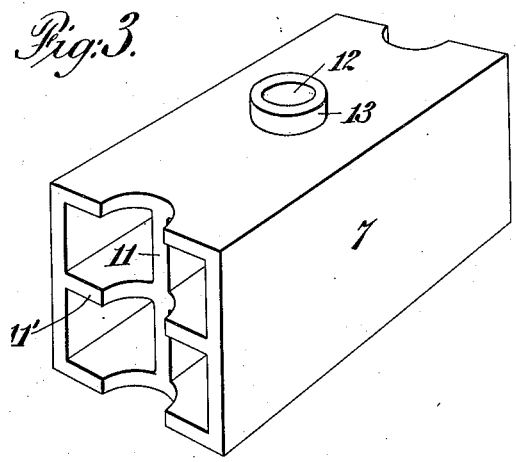
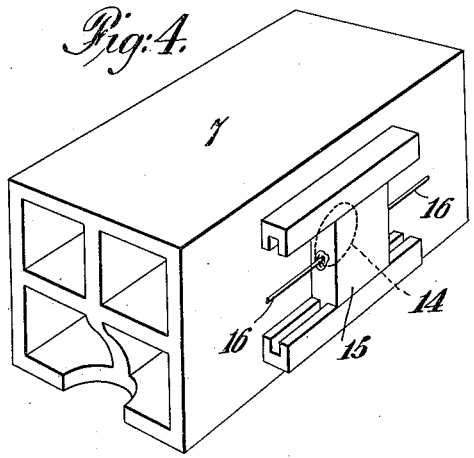
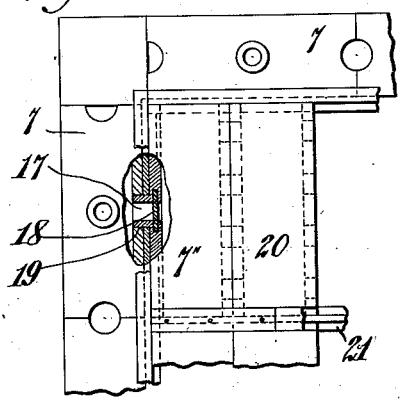
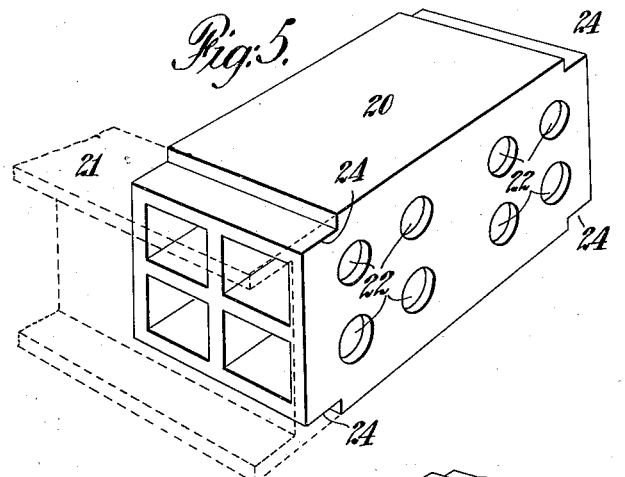
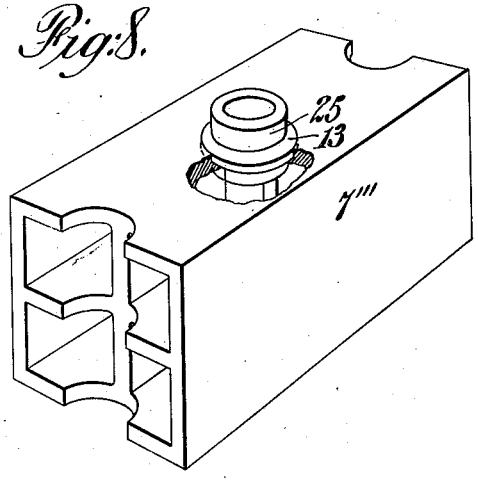
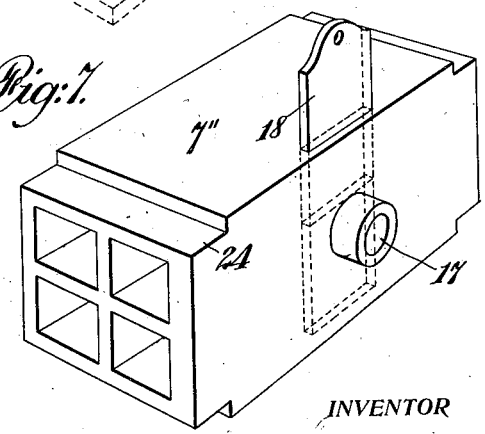
INVENTOR
Eugene Lucas
BY C. Campbell Hunicke
ATTORNEY Patented Feb. 4, 1930

1,745,765

UNITED STATES PATENT OFFICE

EUGENE LUCAS, OF BABYLON, NEW YORK

SYSTEM OF HEATING, DRYING, OR COOLING BUILDINGS

Application filed April 1, 1926. Serial No. 99,076.

This invention relates to a system of heating, drying or cooling buildings.

In the construction of buildings wherein the walls are formed of hollow tile, hollow concrete blocks or other form of plastic blocks, the hollow spaces therein contain dead air and moisture. The moisture is very undesirable and where there is an exterior coating of cement causes cracks and the separation of the cement from the plastic blocks due to the freezing of the moisture which permeates both the cement and the blocks. It is therefore desirable to be able to dry the walls of a building.

Although in many respects hot air heating of a building is desirable, it is not always the most efficient and in addition it is frequently difficult to heat certain sections of a building under all conditions of wind.

One of the objects of this invention is to provide a system whereby the walls of the building may be kept dry. Another object of this invention is to provide a system of heating the walls of a building to maintain within the building a predetermined temperature. Still another object of this invention is to utilize the actual walls of a building as conveyors of heat and to control the heat therein.

Referring to the drawings:

Figure 3, is a perspective view of a block of tile or other plastic material forming the walls of a building and designed to carry out the principles of my invention.

Figure 4, is a perspective view of a block of plastic material used in the top tier of the wall of a building.

Figure 5, is a perspective view of a block of plastic materials used for the floor of a building and showing in dotted lines the supporting beam.

Figure 6, is a detailed plan view partly in section of the floor of a building formed of the blocks shown in Figure 5 and showing the connection thereof with the wall blocks.

Figure 7, is a view in perspective of a wall block that connects with the floor blocks shown in Figure 5.

Figure 8, is a view, parts broken out, showing a modified form of Figure 3 wherein the central passage and exterior collar or nipple is separate and removable from the plastic block.

Figure 1:
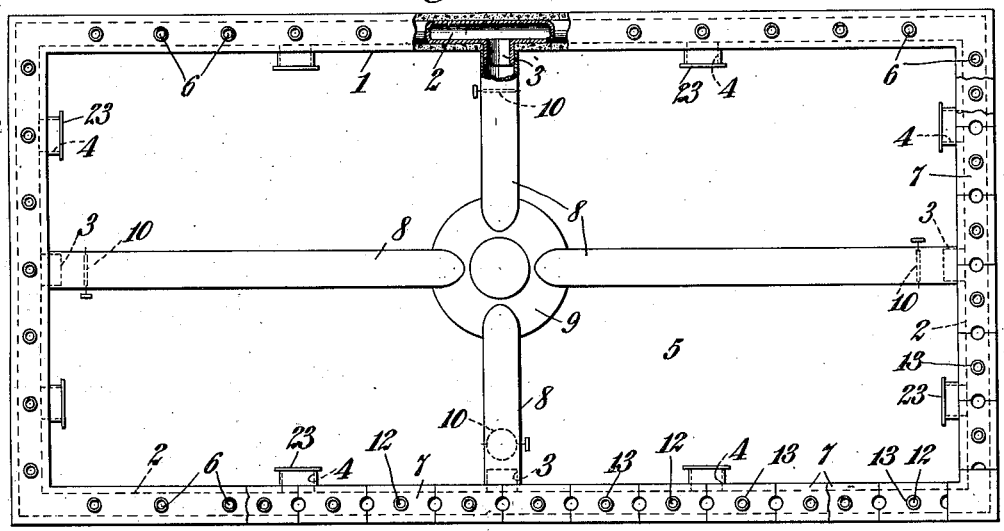
Figure 1, is a plan view of the basement of a building showing the connection of the heating system with the walls thereof.
Figure 2:
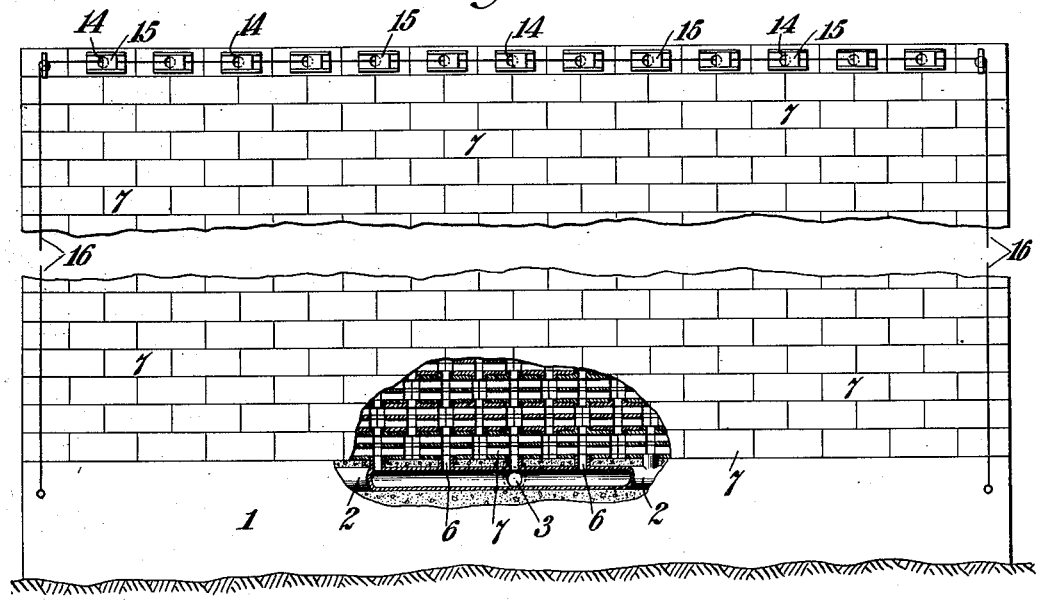
Figure 2, is a view in side elevation, partially in section, of the side wall of a building showing the embodiment therein of the principles of my invention.

In carrying out my invention, I propose to provide the usual form of masonry foundation 1 for the building and having adjacent the top thereof a conduit 2. Conduit 2 has openings 3, 3, and 4, 4, to cellar 5, and openings 6 to plastic blocks 7.

Openings 3, 3, are connected by piping 8, to hot air furnace 9. Dampers 10 control the hot air to conduit 2.

Blocks 7, are of plastic material such as hollow tile, cement, etc., and are of special construction.

Centrally thereof and horizontally are four compartments separated by dividing walls 11, 11', which also function as strengthening ribs.

Centrally of block 7, is a passageway 12 terminating in a nipple or collar 13 beyond the surface of block 7. At each end of block 7 are cutout portions to accommodate the collar 13 of the corresponding block 7 in the tier above and in the tier below. Nipples 13 also function as keys or locking pins.

The top tier of the walls is formed of blocks 7, having side openings 14 and dampers 15 controlled by chains or cords 16. These dampers 15 may be opened or shut to control the heating of the walls or to permit of circulation of air in the summer time.

I also propose to pass the circulating heating medium through the floors and for this purpose I propose to provide, adjacent the side walls, plastic blocks 7", having a side opening 17, damper 18 and collar 19 on one side and openings on the other side to correspond to openings 22 in the floor block 20. Floor blocks 20 are supported by beams 21 and are slid into position. A portion of beams 21 have the top flange removable to permit of the placing of floor blocks 20 and sliding into position. The ends of floor blocks 20 may be notched as at 24 to accommodate the I beams and present a level surface. Openings 22 permit of communication and the passage of air through the floor blocks 20.

In the cellar, I provide caps 23 over openings 4, which caps may either be removable as shown, or have louvers in order to permit of the communication of openings 4 with the cellar to allow a circulation of air in the summer time through the walls of the building to dry the same if desired.

Although I have shown this system in connection with a hot air system, yet it is adaptable to use in connection with a steam or hot water system, since the steam pipes or hot water pipes can be inserted in conduit 2 to heat the air in the walls and floors.

It will be noted in Figure 8, that I have shown a modified form wherein the collar 13 is made separable and insertable in block 7'''. The purpose of making collars 13 separable is to permit shipment without breaking the collars 13 in handling.

Various other modifications might be made and still fall within the scope of my invention, for instance, it might be found desirable to permit some of the heated air to flow into the chambers of the building and in that case blocks 7'' can be used with damper control, or the form of slide valves or dampers can be changed in any well known manner.

What I claim is:

A building wall formed of structural hollow blocks having vertical and horizontal passages, the horizontal passages in each block of one tier intercommunicating with the blocks of the same tier and the vertical passages in each block intercommunicating with the blocks in the adjacent tiers above and below said block, end sealing blocks for each tier at the ends of each tier, a conduit in the foundation of said wall, said conduit communicating vertically with said passages in the lower tier of blocks, means for supplying said conduit with a supply of heating medium, openings delivering to the outer air at the top of each wall and a series of dampers for said openings to control the draft in said wall.

Signed at New York in the county of New York and State of New York this 30th day of March A. D. 1926.

EUGENE LUCAS.